(12) United States Patent
Bakish (10) Patent No.: US 9,741,344 B2
(45) Date of Patent: Aug. 22, 2017

(54) SYSTEM AND METHOD FOR OPERATING DEVICES USING VOICE COMMANDS

(71) Applicant: VocalZoom Systems Ltd., Yokneam Ilit (IL)

(72) Inventor: Tal Bakish, Modi'in (IL)

(73) Assignee: VOCALZOOM SYSTEMS LTD., Yokneam Illit (IL)

( * ) Notice: Subject to any disclaimer, the term of this patent is extended or adjusted under 35 U.S.C. 154(b) by 0 days.

(21) Appl. No.: 14/875,719

(22) Filed: Oct. 6, 2015

(65) Prior Publication Data

US 2016/0111091 A1 Apr. 21, 2016

Related U.S. Application Data

(60) Provisional application No. 62/065,814, filed on Oct. 20, 2014.

(51) Int. Cl.
*G10L 13/00* (2006.01)
*G10L 15/00* (2013.01)
*G10L 15/26* (2006.01)
*G10L 17/22* (2013.01)
*G10L 15/30* (2013.01)
*G10L 15/22* (2006.01)
*G06F 17/27* (2006.01)

(52) U.S. Cl.
CPC .............. *G10L 15/30* (2013.01); *G10L 15/22* (2013.01); *G06F 17/2735* (2013.01)

(58) Field of Classification Search
CPC ......... G10L 13/00; G10L 15/00; G10L 15/26; G10L 17/22

USPC ................. 704/233, 235, 246, 275
See application file for complete search history.

(56) References Cited

U.S. PATENT DOCUMENTS

| | | | |
|---|---|---|---|
| 6,532,446 B1 | 3/2003 | King | |
| 9,437,186 B1 * | 9/2016 | Liu | ........................ G10L 15/05 |
| 9,484,030 B1 * | 11/2016 | Meaney | .................. G10L 15/22 |
| 2003/0076240 A1 * | 4/2003 | Bae | ..................... G05B 19/0426 340/12.5 |
| 2007/0021867 A1 * | 1/2007 | Woo | ........................ B25J 5/00 700/245 |
| 2007/0233482 A1 * | 10/2007 | Lee | ......................... G10L 15/22 704/246 |

(Continued)

OTHER PUBLICATIONS

Yule, "The Acoustic-Optical Microphone", Apr. 2014, https://solentacoustics.wordpress.com/2014/04/02/the-acoustic-optical-microphone.*

(Continued)

*Primary Examiner* — Seong Ah A Shin
(74) *Attorney, Agent, or Firm* — Eitan, Mehulal & Sadot (57) ABSTRACT

System and method for operating electric devices based on voice commands, as well as electric devices that can be controlled via voice commands. An electric device comprises an audio sensor to capture audio that contains speech; and a transmitter to transmit the captured audio to a remote server, together with a dictionary identifier that indicates to the remote server which particular dictionary or vocabulary-set to utilize for performing speech recognition on the recorded audio. The remote server performs speech recognition using the relevant dictionary table; and selects a command-code that is transmitted back to the electric device, to trigger an operational modification of the electric device.

12 Claims, 5 Drawing Sheets

(56) References Cited

U.S. PATENT DOCUMENTS

| | | | |
|---|---|---|---|
| 2009/0190780 A1* | 7/2009 | Nagaraja | G10L 19/012 |
| | | | 381/119 |
| 2010/0055100 A1* | 3/2010 | Roder | A61K 31/517 |
| | | | 424/133.1 |
| 2010/0088100 A1 | 4/2010 | Lindahl | |
| 2013/0117022 A1* | 5/2013 | Chen | G06F 17/3087 |
| | | | 704/235 |
| 2013/0158987 A1* | 6/2013 | Xing | G06F 17/276 |
| | | | 704/10 |
| 2013/0257757 A1* | 10/2013 | Kim | G06F 3/165 |
| | | | 345/173 |
| 2014/0119737 A1* | 5/2014 | Bakish | A41D 13/11 |
| | | | 398/133 |
| 2014/0163978 A1* | 6/2014 | Basye | G10L 15/28 |
| | | | 704/233 |
| 2014/0188463 A1* | 7/2014 | Noh | G10L 15/00 |
| | | | 704/201 |
| 2015/0243287 A1* | 8/2015 | Nakano | G10L 15/30 |
| | | | 704/246 |

OTHER PUBLICATIONS

Giuliani et al., "Laser diode self-mixing technique for sensing applications." Journal of Optics A: Pure and Applied Optics 4.6 (2002): S283.*

International Search Report for application PCT/IB2015/051652 dated Feb. 2, 2016.

\* cited by examiner

SYSTEM AND METHOD FOR OPERATING DEVICES USING VOICE COMMANDS

CROSS-REFERENCE TO RELATED APPLICATIONS

This patent application claims priority and benefit from U.S. provisional patent application No. 62/065,814, filed on Oct. 20, 2014, which is hereby incorporated by reference in its entirety.

FIELD OF THE INVENTION

The present invention generally relates to the field of voice command devices (VCDs), and more particularly to the field of methods and systems for device operation through human voice commands.

BACKGROUND OF THE INVENTION

Billions of people users worldwide utilize a variety of electronic devices every day. For example, many people utilize computers (e.g., a desktop computer, a laptop computer) for professional and personal purposes, for example, to write documents, to browser Internet web-sites, to send and receive electronic mail (email) messages, or the like.

Similarly, many people utilize portable electronic devices to accomplish similar tasks. For example, a user may utilize a smartphone in order to conduct a cellular phone conversation with another person, in order to capture images and video clips, in order to play games, or the like.

Recently, some type of appliances and devices have begun to be implemented in a manner that allows a device or an appliance to be connected to one or more other devices, through the Internet or through a wireless network. For example, some particular models of smoke detectors installed in a home, may be able to wirelessly communicate with a smartphone of the home-owner.

SUMMARY OF THE INVENTION

Some embodiments of the present invention may comprise an electric device or electronic device or appliance which may be controlled via voice commands; as well as a system and method to enable voice-command operation of such electronic devices and electric device or appliance.

The present invention may provide other and/or additional advantages and/or benefits.

DETAILED DESCRIPTION OF SOME EMBODIMENTS OF THE INVENTION

In the following detailed description of various embodiments, reference is made to the accompanying drawings that form a part thereof, and in which are shown by way of illustration specific embodiments in which the invention may be practiced. It is understood that other embodiments may be utilized and structural changes may be made without departing from the scope of the present invention.

Some embodiments of the present invention may operate in conjunction with Voice Command Devices (VCDs). For example, a VCD may be operated and controlled by receiving or capturing or recording or sensing voice input (e.g., audio input, acoustic input, human speech, utterances), and translating or converting such input into commands for operation of the device; such as, for turning the device on or off, for changing a mode of operation of the device, for activating or deactivating a feature of the device, or the like. This allows a user to operate the device without using the user's hands for pressing buttons or turning switches, enabling the user to engage in "hands free" operation of the device, and optionally allowing the user to stand or be located remotely from the device (e.g., without the need to hold or touch the device), and optionally enabling the user to user his hands in order to perform other tasks in parallel or simultaneously.

The VCD may include a controller and/or a processor, which may be connected to an acoustic microphone or other audio sensor for capturing audio and/or identifying voice, and for controlling device operations according to identified voice commands. This technique may be used with various types of appliances or electronic devices, such as electric kitchen appliances, fridge, freezer, oven, toaster, microwave, range, stove, dishwasher, illumination units and systems, lamps, light-bulb fixtures, and the like.

Applicants have realized that there exists a problem in VCDs, such that the processor embedded in the VCD is often a very simple one, often a low-cost reduced-functionality or limited-functionality processor, in order to reduce the cost of the VCD; and thus the simple and low-cost device-embedded processor cannot perform complex real-time speech recognition and word identification processing, as these capabilities typically requires sophisticated, high-end, expensive hardware that may significantly increase the price of such devices. Accordingly, this method is used for simple and basic operational functions of the VCD, such as on/off power switching of the entire VCD, or for controlling television channels for a television, or for setting temperature and timing of a stove.

Some embodiments of the present invention may utilize algorithms and software engines, as well as converters, analyzers, and/or speech recognition modules (which may be implemented by utilizing hardware components and/or software components) for words identification from audio input. Applicants have realized that such algorithms typically require resource-heavy processes, heavy processing, and large vocabularies to choose from. Applicants have also realized that these voice-recognition algorithms are extremely sensitive to noise and have a vast error rate, often causing poor real-life results when a user attempts to control the VCD via voice commands.

Applicants have realized that some conventional systems may either implement inside the application a processor that performs ASR (Automatic Speech Recognition) (Method 1); or to have a processor that records speech and send it to a cloud-based ASR system through a wireless communication link and receives back data indicated the detected words (Method 2).

Applicants have realized that Method 1 is limited in processing power and vocabulary size, but may have (in some implementations) a relatively fast response time. Applicants have realized that Method 2 has virtually no processing or vocabulary limitations, since cloud-based ASR may be implemented by using remote computers having vast processing power and memory; but Method 2 suffers from a larger delay because of the communication interface, namely, due to the need to transmit the captured audio to a remote processing system and to receive back from it the data indicating the recognized voice commands. Applicants have further realized that in both of the methods, at least a general purpose processor is required, and therefore cost and power requirements are relatively high.

Applicants have realized that there is a need for a solution that will enable both low-power and low-cost implementation, as well as short-delay with strong processing and large vocabulary capabilities.

According to some embodiments of the present invention, there is provided a system for operating at least one device (or VCD) using voice commands; such that the system comprises: (a) at least one control module, each control module comprising at least one audio sensor or acoustic sensor or acoustic microphone or audio microphone; wherein the control module is being configured for detecting speech, recording voice input once speech is detected, transmitting the recorded voice input and at least one dictionary ID code over a communication link, and controlling operation of the device; and (b) at least one speech module, operable via at least one remote server, the speech module configured for receiving transmitted voice input and dictionary ID from multiple control modules of multiple devices, identifying the device and dictionary associated therewith through the dictionary ID transmitted therefrom, and operating a speech recognition engine for identifying the one or more words in the received voice input according to the identified dictionary; wherein once the one or more words are identified, at least one command code indicative thereof is sent to the control module, for having the control module of the respective device operating thereof, according to the received command code.

The present invention may comprise a system for operating one or more devices using voice commands; the system comprised of a dedicated hardware module, which may be referred to an IOT-module or an IOT-enabling-module (Internet-of-Things module). The IOT module may reside on or within the end-user device, and may be able to capture and send (e.g., wirelessly transmit) detected voice (e.g., in the form of digital data packets that represent captured audio) to a remote cloud-based server or service or analysis engine; which then analyzes the voice detected, and which associates the voice with a command code. The command code is transmitted-back (e.g., wirelessly) or otherwise returned to the IOT module of the end-user device, in order to trigger or to operate the end-user device, or in order to trigger a controller or circuit within the end-user device to perform a particular operation in response to the identified voice-based command.

In accordance with the present invention, the end-user device and/or the IOT module of the end-user device, has no ASR built or embedded inside it, and does not require any local ASR or other local or device-internal speech recognition; and therefore the end-user device may still remain a low-cost and low-power device, while also enabling use of a remote cloud-based ASR engine which is powerful and robust.

In some embodiments, the IOT module of the end-user device sends to the cloud-based engine a dictionary-ID or dictionary identifier, which may be a string or number or code that is unique for each device, or device-type, or device-model, or device-manufacturer, or device-mode-of-operation; and the transmitted dictionary-ID code or identifier may be used by the remote cloud-based ASR system for limiting or selecting of filtering the vocabulary dictionary that is used by the cloud ASR, thereby tailoring the dictionary used for the particular device or device-type or device-model or device-mode; and thereby increasing the recognition rate and/or accuracy and/or speed, especially in noisy conditions in which the acoustic signal that is captured is not clean or suffers from background noise, interference, or other types of noise.

In some embodiments of the present invention, conversion of the words detected, to command code, by the cloud-based service or engine, may enable the system to utilize a low bit-rate communication link, as well as minimal local processing (or no local processing at all) within IOT-module of the end-user device or within the end-user device, thereby reducing cost and power requirements for the end-user device, as well as keeping the solution and the system robust and modular for use on various types of devices, appliances and/or applications.

The present invention provides systems and methods and modules for operating an electronic device or electric device or appliance (such as, for example, a microwave oven or device, a stove, a television, a fridge, a freezer, a refrigerator, a range, a cooking device, a baking device, a frying device, a kitchen appliance, a coffee maker device, a mixer, a blender, a dishwasher, a laundry machine, a clothes drying machine or dryer, an air conditioning system or aid conditioner, a heater, or other suitable devices, which may be referred to here as "end-user device" or "electric device" or "electronic device" or "appliance"), by using voice commands and by also using Internet of Things (IOT) technology.

It is clarified that the term "end-user device" does not imply as if the device is portable or mobile, or is a personal device or a hand-held device; but rather, the term "end-user device" may include any type of electric device or electronic device or appliance, including kitchen appliance, light fixture, home devices or appliances, or the like.

It is further clarified that portions of the discussion herein, that may refer to a voice-control module "of" a device (or "of" an end-user device), do not imply as if the voice-control module is necessarily embedded within such end-user device; rather, the present invention may be implemented in a variety of ways, for example: the voice-control module "of" the device may be integrated within the device, or may be internal to the device, or may be integrated within or on the device, or may be external to the device but connected to the device, or may be external to the device an in proximity to the device (e.g., within 20 or 50 or 100 centimeters from the device) but not physically touching the device, or may be external to the device and in the vicinity of the device (or in the same room as the device), or may be external to the device but located in a different room (with or without a line-of-sight between the device and the remote-control module), or may be wirelessly coupled or paired with the device, or may be wirelessly or otherwise associated (e.g., operatively associated) with the device being controlled. All such arrangements and combinations may be comprised in embodiments of the present invention, even when portions of the discussion herein relate to a voice-control module "of" the device or "of" the end-user device.

According to some embodiments, the system includes: a control module comprising at least one audio sensor such as a microphone, a communication module and a processing unit configured for voice activity detection (VAD), for recording voice input once speech is detected and for transmitting the recorded voice input and at least one dictionary ID code over a (wireless or wired) communication link (such as via Wi-Fi wireless communication link or the like). The control module is operatively connected to the device, and/or may be embedded therein, or may be added to the device internally, or may be added to the device externally (e.g., connected to an extension port of the device or to other connector of the device). The system further comprises at least one speech module operable via one or more remote servers or cloud-based servers, configured for receiving the transmitted voice input and dictionary ID; and operating a speech recognition engine associated with the identified dictionary for identifying the one or more commands in the voice inputs.

In accordance with the present invention, data and/or signals may be transmitted from the end-user device to the remote server over one or more wireless communication links and/or wireless communication networks and/or wired communication links and/or wired communication networks; for example, Wi-Fi, IEEE 802.11, Wi-Max, IEEE 802.16, cellular data network(s), 3G link or network, 4G link or network, 4G LTE link or network, BlueTooth or Zigbee (e.g., transmitted firstly to a nearby home-based receiver or repeater or wireless hub, and then repeated or relayed over long-range communication link to the remote server or cloud-based server), Internet communication, Local Area Network (LAN), Wide Area Network (WAN), packet-based communication link or network or protocol, TCP/IP packets or links, HTTP communications, HTTPS communications, and/or other suitable communication links, networks and/or protocols.

According to some embodiments of the present invention, once the one or more command words are recognized by the speech module residing at the remote server or the cloud-based server having a speech recognition engine, a command code indicative thereof is sent back or transmitted back (e.g., wirelessly) to the control module of the end-user device via the same link (or by a different type of link), for having the control module be triggered into operating the end-user device (or modifying a feature or a functionality of a mode-of-operation of the end-user device) according to the received command code which was recognized remotely in the remote server or the cloud-based engine.

Each dictionary includes a limited list of words specifically associated with a corresponding one or more lists of commands for the specific end-user device, and optionally for a specific functioning mode of the device; or for a specific type of end-user devices (e.g., the type "microwave oven", the type "stove", the type "air conditioner"), or for a make or manufacturer of devices (e.g., for the make "General Electric", of for the make "LG"), or for the make and type of devices or line of devices (e.g., for "LG laundry machines", or for "General Electric freezers", or "LG TurboWash line of washers"), or for a model number of end-user devices (e.g., for "LG washing machine model WM4270"); or the like.

For example, a dictionary of a specific type of electric microwave device may include a limited list of command words, each associated with a different operational command such as: on, off, set timing and for the number of minutes from 1-10 and number of 10 seconds periods to operate from 1-6. The relatively small number of words in each dictionary for each device dramatically reduces error rate ensuring accurate word recognition and accuracy in operating the right function for each input word(s). Applicants have realized that it may be beneficial to tie or couple a particular end-user device, or a type or model or make or line of end-user devices, to a particular Dictionary which is suitable and/or efficient for that particular device and/or for that type or model or line or make of devices. Applicants have realized that it may be beneficial to tailor a particular speech-recognition dictionary or vocabulary for each such device or device-type or device-model or device-model or device-make, in order to enable efficient, fast and/or accurate speech recognition. Applicants have realized that although many or most electronic devices may share certain commands, such as "on" and "off" (or "turn on" and "turn off"), each device or type-of-device may have its own unique vocabulary words which are unique thereto and which need not be searched for when another device (or device-type) is involved. Applicants have realized, for example, that a microwave oven may often receive a voice command of "defrost one minute", whereas the "defrost" command may not be relevant at all to a dishwasher; and similarly, the "one minute" time period may not be relevant at all to a dishwasher. Similarly, Applicants have realized that a dishwasher may often receive a voice command of "full wash cycle", which may not be relevant to a microwave oven; but may be also relevant to a clothes washer (a laundry machine). Accordingly, Applicants have realized that it may be beneficial, to associate a particular microwave oven with a dictionary file or table or list or database that includes the word "defrost", whereas this word should be excluded from the dictionary of a dishwasher and from the dictionary of a laundry machine; whereas, the term "turn on" may exist in all of those dictionaries; and whereas the term "full wash cycle" may exist in the Dishwasher dictionary and in the Laundry Machine dictionary, but need not exist (and is excluded from) the microwave oven dictionary. These device-specific dictionaries may allow not only faster speech recognition, but also more accurate speech recognition.

Optionally, the use of VAD in the IOT device and receiving back a simple code instead of the actual command, may reduce latency, may reduce processing power and may reduce amount of data transferred back over the communication link, which may increase the performance of the overall process, and which may reduce the cost of the end-user device and/or the cost of operating the end-user device. Although the number of words in each dictionary is limited, it still allows a large vocabulary and strong processing power for the ASR to be used, such that if done via a processor embedded within the end-user device it may significantly increase device cost and may require higher processing power. Therefore, the solution provided by the present invention, allows error-free voice inputted commands identification for operation of multiple functions of the device; wherein the actual speech recognition processing is performed at the remote one or more servers or cloud-based engine, and not by a processor within the end-user device; while at the same time benefiting from the unique device-specific dictionary for accurate speech recognition.

The systems and methods of the present invention, further allow using a central application operable through the one or more remote servers or cloud-based servers, to identify command words for multiple devices of various types and manufacturers and models, having varying functions; and also for various operational codes of the same device by using a different dictionary associated with each of the identified devices and operational mode thereof.

For example, for a television having more than one operational modes, such as configuring station number and volume in viewing mode, and configuring picture brightness in a second mode, different dictionaries may be used for each one of the operational modes. For these devices the control module may be set to transmit a dictionary ID that is associated with the specific device and also the specific mode it is currently set to. For example, when the television is in regular program-watching mode, the command of "volume up" may be relevant; whereas during a setting-modification mode of the television, the command of "brightness up" may be relevant.

The communication between the control module and the one or more remote servers may be enabled via one or more wireless communication links using long range communication technology such as Wi-Fi, Wi-Max, Internet communication, cellular communications, and/or other suitable communication networks and/or links and/or protocols.

According to some embodiments, the voice recognition or voice detection may be performed locally by the control module of the end-user device, using one or more methods for Voice Activity Detection (VAD), optionally depending also on the audio sensor (e.g., acoustic microphone) being used.

The audio sensor may be any type of sensor known in the art that can detect sounds, such as an electret microphone, MEMS microphone, an optical microphone, an audio microphone, an acoustic microphone, a hybrid microphone or a combination thereof, an array or matrix of microphones or sensors, and the like. In some embodiments, such sensors and/or microphones may be embedded within the end-user device; or may connected to the end-user device; or may be located in the same room with the end-user device but may be external to it and non-wired to it and may be able to communicate wirelessly with the end-user device.

According to some embodiments, the server used for the speech recognition for identification of the dictionary that is to be used and the input command words associated with the identified dictionary, may also include or have access to one or more databases including one or more such dictionaries. As mentioned above, a set of command words in each such dictionary may be organized or may be pre-defined, such that each word is associated with a different command code all associated with the specific device (or model, or make, or line of devices, or device-type) and optionally also a functional mode or operational mode thereof.

In case of a device having more than one operational mode, the dictionary of the device may be configured such that the same list of words may be used for all modes, or alternatively, that only some or all may be translated into different command codes. In some embodiments, for example, with the device being a television, the word "up" when the television is displaying a broadcast program may appear in the watching-program dictionary as a command associated with "volume up"; whereas the word "up" when the television is in settings mode in which the brightness level is adjusted, may appear in the settings-dictionary as a command associated with "brightness up".

Each vendor or manufacturer of each electric or digital device or appliance may set the control module associated therewith according to its own goals and/or requirements, depending on the number and type of functions (or modes, or commands) of the device and the manner in which they are set or the manner in which they may be modified.

According to some embodiments, the control module may optionally include (or may not include) the audio sensor, a processing unit or a processor or any other type of a circuit board having a communication interface (e.g. Wi-Fi).

According to some embodiments, the control module may also transmit an access code required to access the communication network, the remote server and/or the communication link; such as a Wi-Fi user code (e.g., password to access a local Wi-Fi network), depending on the server system and/or communication link requirements and/or network requirements, or depending on requirements of other network elements (e.g., a home-based wireless Access Point (AP) or wireless router or wireless hub, which may require SSID network identifier and a password in order to authorize network access).

The voice based device control may be an additional manner for controlling the device by inputting voice based commands, wherein the device may also include an input interface allowing the user to control it by pressing buttons, switching switches, typing on a keyboard or keypad, utilizing a touch-screen, and the like; or alternatively, in some implementations, the voice control may be the only means for controlling the device, and other interfaces may be excluded and may not be needed, thereby allowing to achieve a smaller form-factor to the device (due to the lack of touch interface or physical interface) as well as reducing cost for the entire device (due to the lack of touch interface or physical interface).

Figure 1:
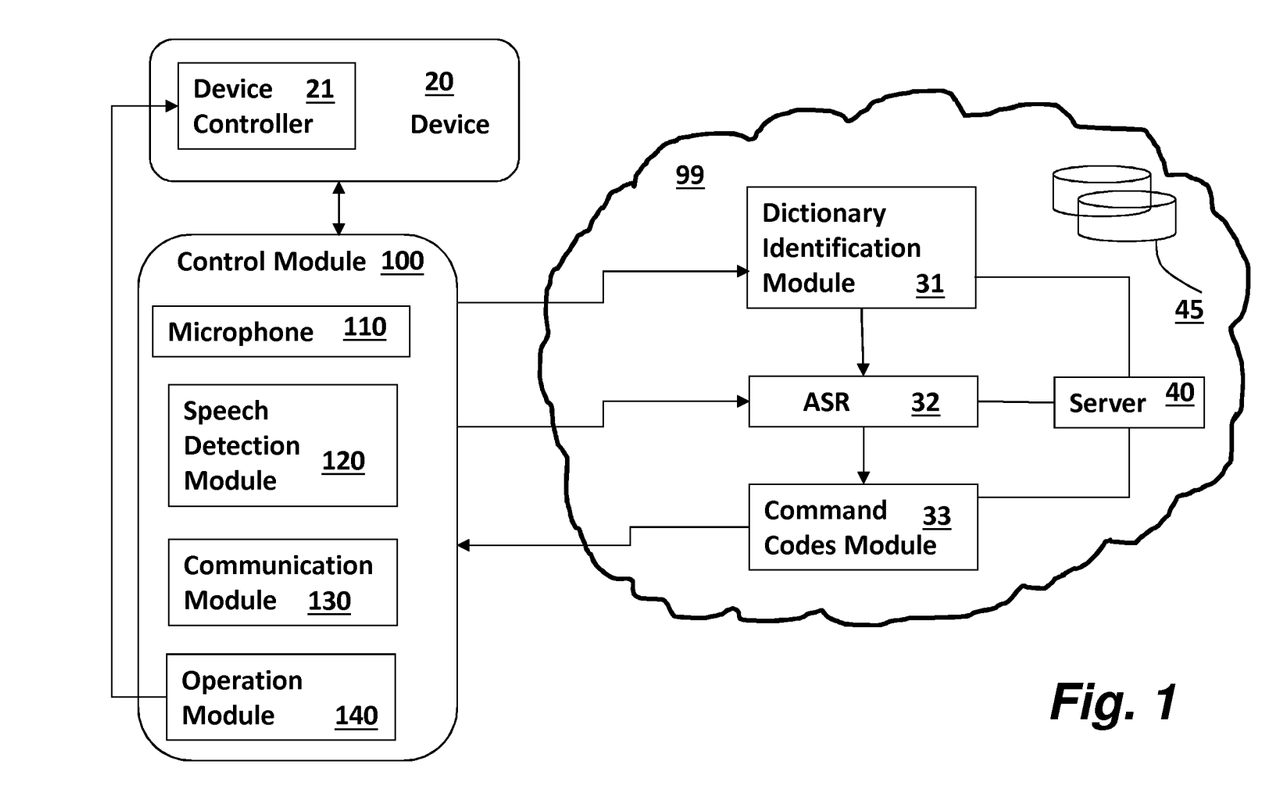
FIG. 1 is a block diagram showing a system for operating a device by using voice input and remote speech recognition processing, according to some demonstrative embodiments of the present invention.

Reference is now made to FIG. 1, which is a block diagram, schematically illustrating a system for operating a device 20 (e.g., an end-user device or appliance or electronic device), having a device controller 21, by using voice commands, according to some demonstrative embodiments of the present invention. The system includes a control module 100 having (or connected to) an audio sensor, such as a microphone 110, for sensing audio signals; a speech detection module 120, configured to detect voice, e.g., by utilizing Voice Activity Detection (VAD) methods and configured to record or capture the detected voice during the voice activity that was detected (e.g., storing the captured voice as an audio clip or audio file, or other suitable format or representation); a communication module 130 for transmitting and receiving data over one or more wireless communication links, such as through Wi-Fi communication link 99 and/or to connect to a cloud network (e.g., implemented as a transceiver, wireless transceiver, wireless transmitter, wireless receiver, Wi-Fi module, or the like); and an operation module 140, configured to operate the device and control its functionality.

The device 20 may optionally include or store locally, one or more dictionary codes; for example, a first code indicating the "general" dictionary of the device that includes all the relevant vocabulary of the device; a second code indicating a "mode-specific" dictionary of the device which includes only the words that are relevant when the device is operative in a first operational mode; a third code indicating another "mode-specific" dictionary of the device which includes only the words that are relevant when the device is operative in a second, different, operational mode; or the like. It is noted that in some embodiments, the dictionary itself (namely, the actual vocabulary words) need not necessarily be stored within the end-user device, and may be excluded from being stored within the device, in order to keep the device cost to remain low, and in order to maintain a small form-factor for the device; and such dictionary or dictionaries may actually be stored, with their relevant vocabulary, at the remote server or cloud-based speech recognition engine, together with an association code of the Dictionary ID. In a demonstrative example, a microwave oven may only store locally a single indication, that it is associated with "Dictionary Number 4032"; whereas the actual content (vocabulary) of that particular dictionary, may not be stored locally within the microwave oven, and may be stored only remotely at the remote or cloud-based server, together with a header or key or association that identifies that list as "Dictionary Number 4032".

The communication module 130 is configured for transmitting the recorded or captured voice input, along with one or more ID codes for identifying a dictionary including a list of words such as command words associated with the specific device (or device type, or device model, or device maker), and optionally also access data for using the local or non-local communication network link 99. The ID code (which may also be referred to herein as "Dictionary ID") may indicate the particular dictionary (e.g., set of words; vocabulary) associated with the specific device, and also optionally associated with a specific mode the device is operated in at the current time if the device has more than one operational modes and if the device was pre-defined by the maker to associate different dictionaries with different modes-of-operation. For example, if the device 20 has two operational modes, each requiring a different set of operation command, and therefore a different dictionary, then the control module 100 may firstly identify the operational mode that the device 20 is currently operating in; and then may transmit the voice input and a dictionary ID associated with the specific device and specific operational-mode that it currently operates in.

According to some embodiments, as demonstrated in FIG. 1, the system further comprises one or more modules operable via one or more remote servers or cloud-based entities, such as server 40, that are configured for receiving the transmitted data from the control module 100 of the end-user device 20 via the communication link 99 and further configured to process it to select or to identify (by a Dictionary Identification Module 31) the corresponding dictionary using the dictionary ID data, and for analyzing the voice input data according to the identified dictionary using one or more speech recognition algorithms and techniques, for example ASR (Automatic Speech Recognition module) 32, for identifying or recognizing the recorded words therein by using a suitable ASR or SR algorithms. These modules are also configured to translate the identified words into command codes 33 using the identified dictionary or another dictionary associated with the identified device, for transmitting back to the control module 100 through the communication module 130 the command codes which the operation module 140 will convert to controls for operating the device 20 thereby. For example, the ASR module may recognize the words "volume up"; which may be converted into Command Code "5" (by using a list or lookup-table of command codes), such that the wireless communication link may transmit only "5" or "CC5" for Command Code 5, without requiring to transmit the identified words "volume up" to the end-user device. Accordingly, the remote server or cloud-based engine, which may remotely analyze the locally-captured audio, may recognize words or utterances; and may transmit back to the end-user device only command-codes determined remotely from said recognized utterance, without transmitting back to the end-user device the actual words that were recognized in the captured speed. The control module 100 may be configured to (wirelessly) receive the command code(s) from the remote server, and based on the received command code(s), to trigger operating or modifying the end-user device 20 accordingly, by connecting or communicating in any other way with the device controller 21, or by otherwise triggering the end-user device 20 or a particular component or module of the end-user device 20 to operate or to modify its operation.

According to some embodiments, as demonstrated in FIG. 1, the system comprises a remotely operable dictionary identification module 31 associated with one or more databases 45. The dictionary identification module 31 may identify or may select the relevant one of several dictionaries available in the one or more databases 45 according to the transmitted dictionary ID data sent by the control module 100 of the end-user device 20. Once the relevant dictionary is identified or selected, an automatic speech recognition (ASR) engine 32 is operated in the remote server or the cloud-based entity, to identify or recognize the actual one-or-more words in the recorded data of the input voice. The ASR engine 32 may use the particular identified dictionary that was selected from the database 45, which has a limited selected number of command words that are associated with the specific device (or device model, or device maker, or device-type) and optionally with an operational mode thereof, wherein each such command word may be associated with a command code (e.g., representing by a list or table or lookup table). Since the list has a limited number of words, error rate of the ASR engine 32 is small, allowing to accurately identifying the one or more spoken words or utterances in the recording or in the locally-captured audio. Each command word in the dictionary is associated with a single command code, the association performed by command codes module 33, in an injective manner or by utilizing a lookup table or list or conversion table (e.g., converting "Volume Up" to "command-code-5" or "CC5" or just "5"; or converting "defrost" to "command-code-7" of "CC7" or just "7").

It is clarified that in order to not obscure the invention, some portions of the discussion herein may relate to simplified representations such as "CC5" or the like; whereas in some actual implementations, the actual string or data or bits that may be communicated wirelessly to the end-user device 20 may optionally include error-reducing mechanisms (e.g., CRC bit(s)), and/or may optionally be encrypted and/or digitally signed (e.g., to ensure authenticity and/or integrity of the data), and/or may be part of a longer message which may include header(s) and/or other identifiers (e.g., identifier of the remote server, and/or identifier of the targeted end-user device 20, in order to ensure that the message is acted-upon by the intended recipient device, for example, by the microwave oven located in the kitchen, and not by a second microwave oven which may be located in a neighbor's house or a neighboring apartment). In some embodiments, each message exchanged between the end-user device 20 and the remote server, may optionally include unique identifiers to ensure that the response indeed reaches the same end-user device that is intended to be operated, and not another appliance or device; and/or to mitigate the ability of a hacker or attacker to transmit fraudulent or unauthorized commands to an appliance or device of a victim user.

Once a command word is identified and its associated command code is determined, by the command code module 33, the server 40 transmits the determined command code via the communication link 99 to the control module 100 of the end-user device, for having the operation module 140 of the end-user device control the operation of the end-user device 20 according to the received command code.

Figure 2:
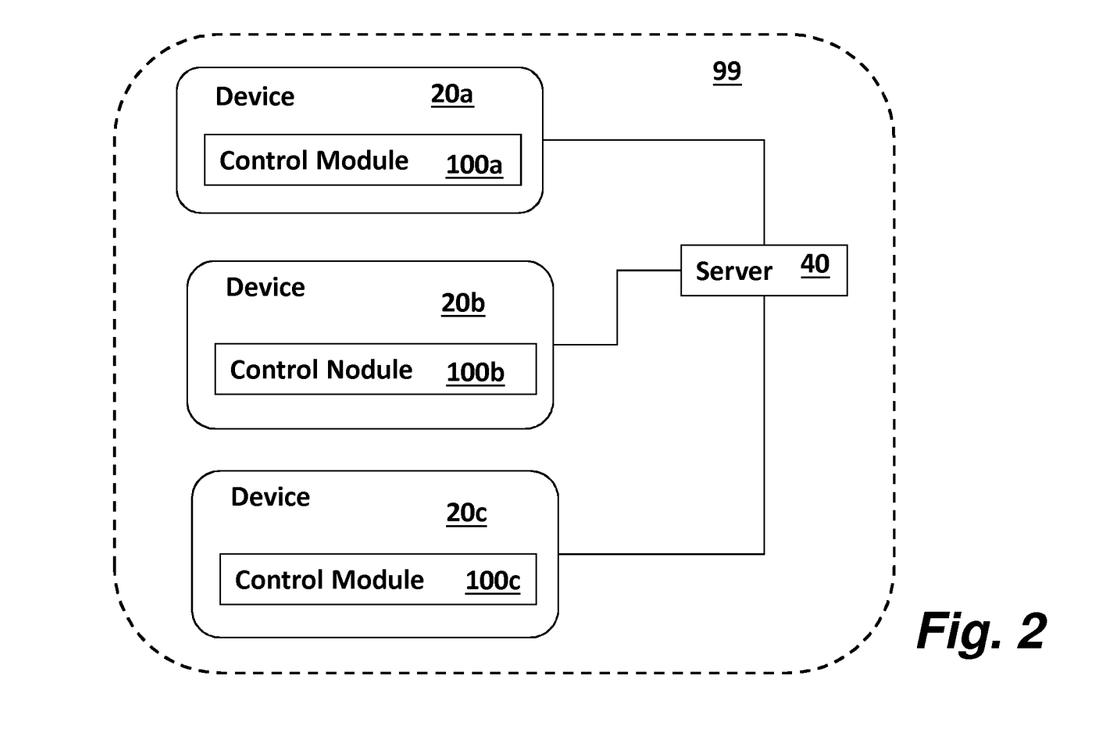
FIG. 2 is a block diagram schematically showing how the same remote server may be used for speech recognition processing for multiple devices, according to some demonstrative embodiments of the present invention.

FIG. 2 is a block diagram schematically demonstrating how the same remote server 40 may be used for remote speech recognition processing for (or on behalf of) multiple different end-user devices 20a-20c, which may be located in various locations, according to some demonstrative embodiments of the present invention. Each end-user device has the control module 100a-100c embedded therein (or attached thereto, or otherwise being associated with it, optionally utilizing a wired connection or by utilizing a low-range or local wireless connection link or pairing technique), and may be configured for controlling operations or features or functionalities of a particular device 20a-20c accordingly, and for sensing and recording (or capturing) audio input, locally identifying voice activity, and communicating with the remote server 40 via wired and/or wireless communication link(s) 99.

The remote server 40 operates modules such as 31-33 configured for receiving data from multiple control modules such as modules 100a-100c, to identify each device 20a-20c associated with each of the control modules 100a-100c and their associated dictionaries, and to process their recorded voice inputs for identifying the commands inputted by the users of these devices 20a-20c. The dictionary identification and speech recognition are similarly executed as mentioned in relation to FIG. 1, wherein the finally identified one or more command codes from each device 20a, 20b or 20c are sent back (e.g., wirelessly transmitted back) to the particular corresponding control module 100a, 100b or 100c. This allows centralized one or more remote processing centers to carry out the speech recognition processing, and therefore requiring simple and low-cost processing abilities from the control modules 100, 100a-100c.

According to some embodiments, the control module 100, 100a-100c of each end-user device may be implemented as an integrated circuit (IC) in a form of a chip, or a module embedded in the controller of the end-user device, while the microphone may be connected directly or indirectly to the control module of the end-user device. In some embodiments, optionally, the microphone may be an integral part of the control module 100, such that a combined control-module and microphone may be provided as a pre-manufactured combination or assembly.

Figure 3:
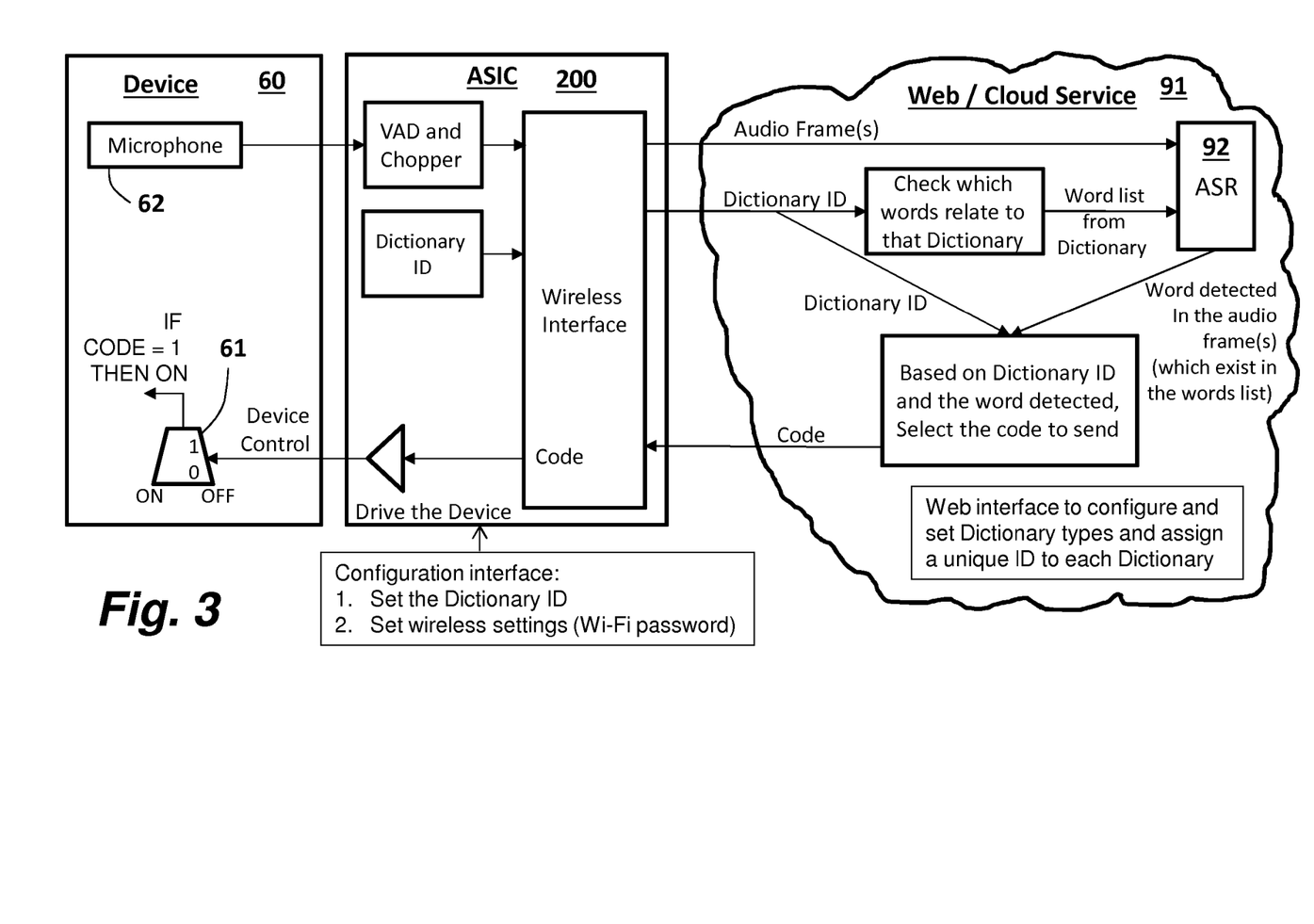
FIG. 3 is a block diagram showing a system for operating a device by using voice input, according to some demonstrative embodiments of the present invention.

Reference is now made to FIG. 3, which is a block diagram showing a system for operating a device 60 by using voice input, according to some other demonstrative embodiments of the present invention. In this demonstrated case, the microphone 62 may be embedded in the device 60, wherein a control module of an application 200 connects to the controller 61 of the device 60. The control module 200 includes a VAD based speech detection module, configured for identifying voice activity and recording or capturing such voice activity (e.g., as audio data, audio file, audio clip, or other suitable digital representation); and a communication module configured for transmitting the recorded voice input together with a dictionary ID to a remote web server 91 (or other remote server, or other cloud-computing element or entity) for performing the automatic speech recognition (ASR) 92 of the recorded voice input according to the identified dictionary, similarly to the described above.

According to some embodiments of the invention, the ASR module 92 is configured for identifying the word or words in the voice input sent, which may be the most likely word or words that can be selected from the identified dictionary; thereby increasing the probability of accurate words identification. Once the word or words are identified or recognized, their corresponding command code may be obtained from the dictionary or from an associated lookup table; and the command code is transmitted back (e.g., over a wireless communication link, or over one or more communication links that include at least one wireless communication links) to the control module 200 of the end-user device 60, for having the control module 200 operate the end-user device 60 according to the identified command code (e.g., directly operating, or by triggering another component of the end-user device 60 to operate or to modify its operation).

According to some embodiments, the modules operable via the remote server(s) of the present invention may optionally be configured to store data associated with each speech recognition session relating to each end-user device, recording or logging or storing (e.g., in a remote server, a remote logbook, a remote database, a cloud-based repository) the time and date in which each command code has been transmitted by the system to each end-user device that it communicates with, as well as other suitable parameters (e.g., the exact command code that was identified; the actual words that were recognized; or the like). The modules of the remote server may be combined into a web application that can be accessed by users via users' accounts, via a web browser, via a native "app" or application for smartphone or tablet or portable device, or the like. In some embodiments, the remote logbook or database may be utilized for automatically generating valuable insights that a manufacturer may utilize; such as, to identify that only 5% of the commands to a certain microwave oven are "defrost" commands, whereas 95% of the commands to that microwave oven are "heat" commands, or the like.

Figure 4:
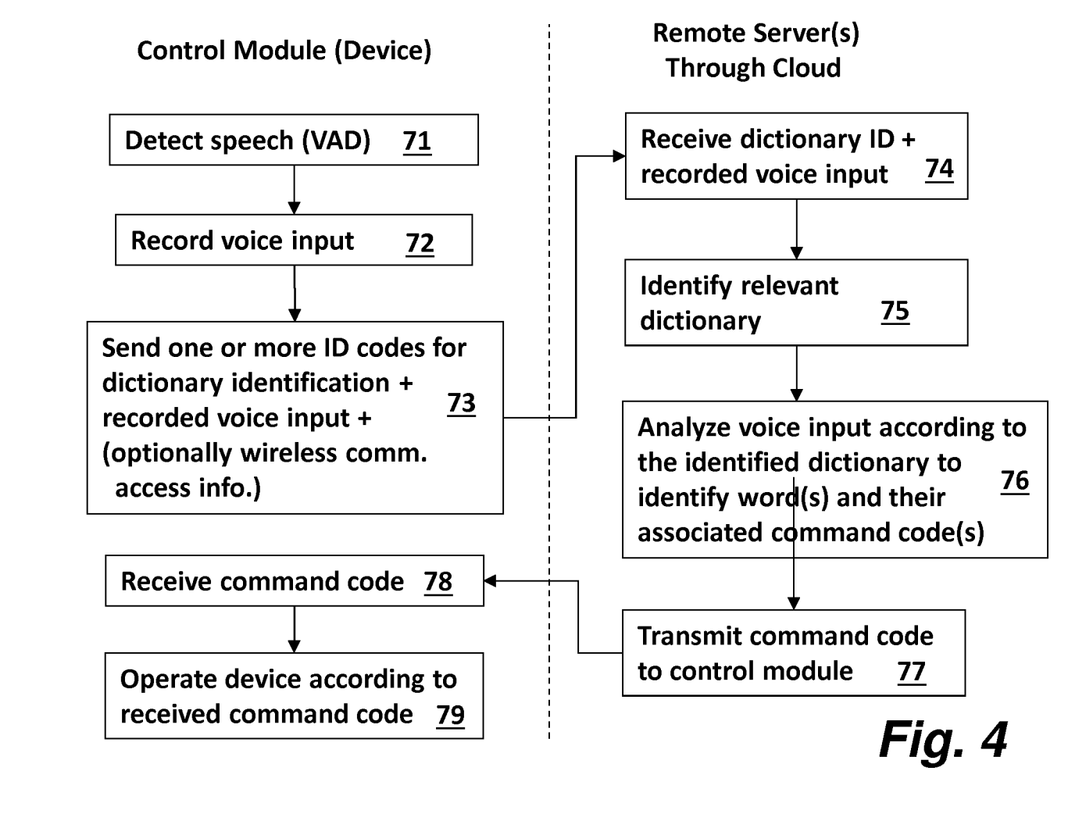
FIG. 4 is a flowchart showing a method for operating a device by using voice input, according to some demonstrative embodiments of the present invention.

Reference is now made to FIG. 4, showing a flowchart of a method for operating a device by using voice input, according to some demonstrative embodiments of the present invention. The method includes, for example: detecting voice activity 71 from the audio sensor installed in (or connected to) the end-user device, as a VAD processing algorithm identifies voice activity; recording speech of the user 72 throughout the time in which voice activity is detected, or over a predefined time interval sufficiently long to allow the user to input the longest command by voice; transmitting one or more ID codes for dictionary identification 73, as well as a digital representation of the recorded voice input 73, and optionally also a wireless communication network access code 73 or password or other credentials or authorization data. Then, the transmitted data is received at the remote server 74; which identifies the relevant dictionary, according to the dictionary ID code(s) 75. Once the relevant dictionary is identified, the voice input is analyzed via speech recognition algorithms 76, to identify the one or more command words therein, and for identifying one or more command codes associated with the identified command word(s) 77. The identification of the words is done in respect to the limited selection of words in the relevant dictionary 76. The dictionary also allows identifying the command code associated with each identified word 77. These codes in the dictionary may be associated with the specific end-user device (or, with a type of devices, or a model of device, or a manufacturer or maker of device, or a line of devices). Once the command code(s) are identified in respect to the analyzed frame of voice input that was received from the end-us device, the command code(s) are transmitted back to the control module of the end-user device 78 via the communication link (e.g., wirelessly). The transmitted command code(s) data is then received (e.g., wirelessly) at the control module of the end-user device 79, to enable it to control operation of the device according to the received command code(s) data 80, either directly or by triggering other components of the end-user device to operate or to modify their operations.

Figure 5:
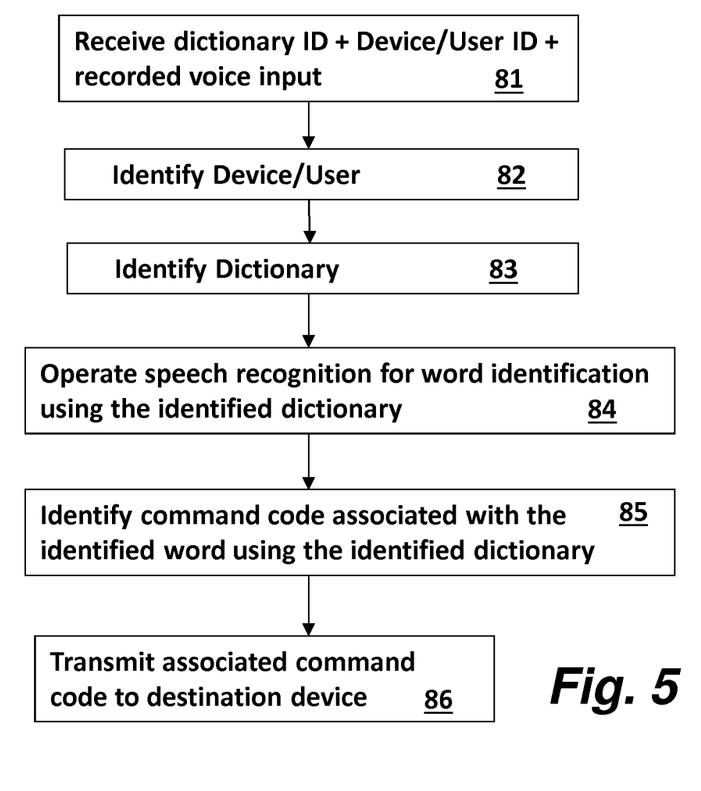
FIG. 5 is a flowchart schematically showing a method of using a single application operable via a remote server to perform speech recognition processing to voice input from control modules of multiple devices, according to some demonstrative embodiments of the present invention.

FIG. 5 is a flowchart schematically showing a method of using a single application operable via a remote server, to perform speech recognition processing of voice input from control modules of multiple end-user devices, according to some demonstrative embodiments of the present invention. For example, the application receives data from one of the many devices' control modules 81. This data includes, for example: Device ID data, wherein the identification of the device alone may optionally indicate the relevant dictionary thereof (e.g., integrally, and without the need to send or to receive a Dictionary ID separately), or the data includes also the dictionary ID and the recorded voice input data. The application then identifies first the device 82 and then the dictionary associated therewith 83. The device identification data may include a destination data, allowing the server to transmit the output data to the control module of the identified device; or may include a code indicative of the device, allowing the application to search through a designated database or lookup table (e.g., stored remotely) for identifying details required for transmitting data back to the relevant control module of the identified end-user device.

Once the dictionary is identified 83, the application operates a speech recognition algorithm 84 for identifying one or more words in the voice input; and then finds or determines one or more command codes associated therewith, using the identified dictionary 85. The identified associated one or more command codes are then transmitted to the device's control module 86 via the wireless communication link, using the data retrieved or identified for communicating with the respective control module.

Some embodiments of the present invention may enable to implement and/or to provide a "universal" voice-control remote-control module or system; enabling to modify or upgrade or implement various one-or-more appliances or devices, which are not conventionally voice-controlled, to become voice-controlled devices or appliances.

Some embodiments of the present invention may comprise a control component to enable operation and/or controlling of an electric device via voice commands, the control component comprising: an audio sensor to capture audio; a voice detector to detect speech uttered within said audio; an audio recorder to record audio captured by said audio sensor, during a time-period in which speech is detected by said voice detector within said audio; a wireless transmitter to wirelessly transmit to a remote server, over one or more wireless communication links, a message comprising: (A) digital data reflecting the recorded audio; (B) a Dictionary Identifier Code (DIC) to indicate a particular dictionary table that should be used for performing speech recognition on said recorded audio, out of multiple dictionary tables that correspond to multiple different electric devices that are voice-controllable; a wireless transceiver to wirelessly receive from said remote server, over one or more wireless communication links, data representing a command code determined by said remote server based on speech recognition performed by said remote server on said recorded audio, wherein the command code represents a pre-defined command to the electric device to modify one or more operational parameters of the electric device; an operation control module to trigger one or more modifications to the operation of the electric device, based on the received command code.

In some embodiments, the wireless transmitter is to transmit to the remote server said Dictionary Identifier Code (DIC) which is unique to said electric device.

In some embodiments, the wireless transmitter is to transmit to the remote server said Dictionary Identifier Code (DIC) which is non-unique to said electric device and which is unique to a manufacturer of said electric device.

In some embodiments, the wireless transmitter is to transmit to the remote server said Dictionary Identifier Code (DIC) which is non-unique to said electric device and which is unique to a model number associated with said electric device.

In some embodiments, the wireless transmitter is to transmit to the remote server said Dictionary Identifier Code (DIC) which is non-unique to said electric device and which is unique to a line-of-products to which said electric device belongs.

In some embodiments, the wireless transmitter is to transmit to the remote server said Dictionary Identifier Code (DIC) which is non-unique to said electric device and which is unique to a type-of-product to which said electric device belongs.

In some embodiments, the wireless transmitter is to transmit to the remote server said Dictionary Identifier Code (DIC) which is represented within a unique identifier of said electric device and is not a separate data item.

In some embodiments, the wireless transmitter is to transmit to the remote server said Dictionary Identifier Code (DIC) which is included within a unique identifier of said electric device.

In some embodiments, the control component further comprises: a DIC selector module, (a) to determine that the electric device is currently operating within a particular operating mode; and (b) to select a particular DIC value that corresponds to said particular operating mode, out of a plurality of DIC values stored within the electric device, wherein said particular DIC value indicates a limited-scope vocabulary dictionary that should be used by the remote server for speech recognition of the recorded audio when the electric device is operating in said particular operating mode.

In some embodiments, the audio sensor comprises an acoustic microphone that is located within the electric device.

In some embodiments, the audio sensor comprises an acoustic microphone that is located externally to the electric device.

In some embodiments, the audio sensor comprises at least a laser-based microphone that is located externally to the electric device.

In some embodiments, the audio sensor comprises: an acoustic microphone; and a laser-based microphone that is located externally to the electric device.

In some embodiments, the electric device comprises a kitchen appliance.

In some embodiments, a server computer is to perform speech recognition on audio captured by a voice-control component associated with a remote electric device, the server computer comprising: a multiple-dictionary database to store multiple dictionary tables; wherein a first dictionary table corresponds to a first vocabulary-set that should be used for speech recognition on audio captured by said remote electric device; wherein a second, different, dictionary table corresponds to a second vocabulary-set that should be used for speech recognition on audio captured by another, different, electric device; a processor to receive an incoming message, that was transmitted wirelessly by the voice-control component associated with the remote electric device, wherein the incoming message comprises: (A) digital data reflecting recorded audio that was recorded by said voice-control component associated with the remote electric device; (B) a Dictionary Identifier Code (DIC) to indicate a particular dictionary table that should be used for performing speech recognition on said recorded audio of said remote electric device; a dictionary selector to select, from said multiple-dictionary database, a particular dictionary table based on said DIC in said incoming message; an Automatic Speech Recognition (ASR) engine to recognize speech in said recorded audio based on said particular dictionary table indicated by said DIC and selected by said dictionary selector; a command-code selector to select a particular command-code, from a pre-defined list of command-codes that are relevant to said remote electric device, based on speech recognized by said ASR engine; a message constructor to construct an outgoing message, intended for transmission from said server computer to the voice-control component associated with the remote electric device, wherein the outgoing message comprises said particular command-code to enable said remote electric device, upon receipt of said outgoing message, to modify an operational parameter of said remote electric device.

In some embodiments, said multiple-dictionary database is to store: a first subset-dictionary, which corresponds to a first subset of vocabulary that is relevant to said remote electric device when said remote electric device is operating in a first operational mode; a second subset-dictionary, which corresponds to a second, different, subset of vocabulary that is relevant to said remote electric device when said remote electric device is operating in a second, different, operational mode; wherein the incoming message comprises data indicating which subset-dictionary to select for speech recognition of audio recorded by said remote electric device that is currently operating in a particular operational mode that is either the first operational mode or the second operational mode.

In some embodiments, the incoming message comprises said Dictionary Identifier Code (DIC) which is unique to said remote electric device.

In some embodiments, the incoming message comprises said Dictionary Identifier Code (DIC) which is non-unique to said remote electric device and which is unique to a manufacturer of said remote electric device.

In some embodiments, the incoming message comprises said Dictionary Identifier Code (DIC) which is non-unique to said remote electric device and which is unique to a model number associated with said remote electric device.

In some embodiments, the incoming message comprises said Dictionary Identifier Code (DIC) which is non-unique to said remote electric device and which is unique to a line-of-products to which said remote electric device belongs.

In some embodiments, the incoming message comprises said Dictionary Identifier Code (DIC) which is non-unique to said remote electric device and which is unique to a type-of-product to which said remote electric device belongs.

In some embodiments, the incoming message comprises said Dictionary Identifier Code (DIC) which is represented within a unique identifier of said remote electric device and is not a separate data item.

In some embodiments, the incoming message comprises recorded audio that was captured by an acoustic microphone of said remote electric device and that was transmitted from said remote electric device to the server computer over at least a wireless communication link.

In some embodiments, the incoming message comprises recorded audio that was captured by an acoustic microphone of said remote electric device and that was enhanced by noise reduction using a laser-based microphone, prior to the recorded audio being transmitted from said remote electric device to the server computer over at least a wireless communication link.

Some embodiments may comprise a method to enable operation of an electric device via voice commands, the method comprising: capturing audio via an audio sensor; detecting that speech is uttered within said audio; recording audio captured by said audio sensor, during a time-period in which speech is detected within said audio; wirelessly transmitting to a remote server, over one or more wireless communication links, a message comprising: (A) digital data reflecting the recorded audio; (B) a Dictionary Identifier Code (DIC) to indicate a particular dictionary table that should be used for performing speech recognition on said recorded audio, out of multiple dictionary tables that correspond to multiple different electric devices that are voice-controllable; wirelessly receiving from said remote server, over one or more wireless communication links, data representing a command code determined by said remote server based on speech recognition performed by said remote server on said recorded audio, wherein the command code represents a pre-defined command to the electric device to modify one or more operational parameters of the electric device; triggering one or more modifications to the operation of the electric device, based on the received command code.

In some embodiments of the present invention, the end-user device may comprise, or may optionally be associated with, an optical microphone or laser microphone or laser-based microphone, which may enhance the quality of the audio captured by an acoustic microphone; or which may be utilized for removing or reducing noise(s) from acoustic signals being captured or recorded. In some embodiments, the end-user device may comprise, or may optionally be associated with, a hybrid sensor or hybrid microphone, or a matrix or array of sensor(s) and/or microphones, which may comprise one-or-more acoustic microphone(s) and/or one-or-more laser microphone(s), which may be distributed and/or co-located, or which may be within the end-user device or near (in proximity to) the end-user device, or which may be located in other relevant locations or devices (e.g., within a home-based entertainment center or music center; within a wireless communication hub; or the like). Accordingly, the terms "microphone" or "sensor", as used herein, may optionally include also a laser microphone, or a hybrid microphone, or a combination or arrangement of acoustic microphone and laser microphone.

In some embodiments of the present invention, which may optionally utilize a laser microphone, only "safe" laser beams or sources may be used; for example, laser beam(s) or source(s) that are known to be non-damaging to human body and/or to human eyes, or laser beam(s) or source(s) that are known to be non-damaging even if accidently hitting human eyes for a short period of time. Some embodiments may utilize, for example, Eye-Safe laser, infra-red laser, infra-red optical signal(s), low-strength laser, and/or other suitable type(s) of optical signals, optical beam(s), laser beam(s), infra-red beam(s), or the like. It would be appreciated by persons of ordinary skill in the art, that one or more suitable types of laser beam(s) or laser source(s) may be selected and utilized, in order to safely and efficiently implement the system and method of the present invention.

In some embodiments which may optionally utilize a laser microphone or optical microphone, such optical microphone (or optical sensor) and/or its components may be implemented as (or may comprise) a Self-Mix module; for example, utilizing a self-mixing interferometry measurement technique (or feedback interferometry, or induced-modulation interferometry, or backscatter modulation interferometry), in which a laser beam is reflected from an object, back into the laser. The reflected light interferes with the light generated inside the laser, and this causes changes in the optical and/or electrical properties of the laser. Information about the target object and the laser itself may be obtained by analyzing these changes.

The present invention may be utilized in, or with, or in conjunction with, a variety of devices or systems that may benefit from noise reduction and/or speech enhancement; for example, a smartphone, a cellular phone, a cordless phone, a video conference system, a landline telephony system, a cellular telephone system, a voice-messaging system, a Voice-over-IP system or network or device, a vehicle, a vehicular dashboard, a vehicular audio system or microphone, a dictation system or device, Speech Recognition (SR) device or module or system, Automatic Speech Recognition (ASR) module or device or system, a speech-to-text converter or conversion system or device, a laptop computer, a desktop computer, a notebook computer, a tablet, a phone-tablet or "phablet" device, a gaming device, a gaming console, a wearable device, a smart-watch, a Virtual Reality (VR) device or helmet or glasses or headgear, an Augmented Reality (AR) device or helmet or glasses or headgear, a device or system or module that utilizes speech-based commands or audio commands, a device or system that captures and/or records and/or processes and/or analyzes audio signals and/or speech and/or acoustic signals, and/or other suitable systems and devices.

In some embodiments of the present invention, which may optionally utilize a laser microphone or optical microphone, the laser beam or optical beam may be directed to an estimated general-location of the speaker; or to a pre-defined target area or target region in which a speaker may be located, or in which a speaker is estimated to be located. For example, the laser source may be placed inside a vehicle, and may be targeting the general location at which a head of the driver is typically located. In other embodiments, a system may optionally comprise one or more modules that may, for example, locate or find or detect or track, a face or a mouth or a head of a person (or of a speaker), for example, based on image recognition, based on video analysis or image analysis, based on a pre-defined item or object (e.g., the speaker may wear a particular item, such as a hat or a collar having a particular shape and/or color and/or characteristics), or the like. In some embodiments, the laser source(s) may be static or fixed, and may fixedly point towards a general-location or towards an estimated-location of a speaker. In other embodiments, the laser source(s) may be non-fixed, or may be able to automatically move and/or change their orientation, for example, to track or to aim towards a general-location or an estimated-location or a precise-location of a speaker. In some embodiments, multiple laser source(s) may be used in parallel, and they may be fixed and/or moving.

In some demonstrative embodiments of the present invention, which may optionally utilize a laser microphone or optical microphone, the system and method may efficiently operate at least during time period(s) in which the laser beam(s) or the optical signal(s) actually hit (or reach, or touch) the face or the mouth or the mouth-region of a speaker. In some embodiments, the system and/or method need not necessarily provide continuous speech enhancement or continuous noise reduction; but rather, in some embodiments the speech enhancement and/or noise reduction may be achieved in those time-periods in which the laser beam(s) actually hit the face of the speaker. In other embodiments, continuous or substantially-continuous noise reduction and/or speech enhancement may be achieved; for example, in a vehicular system in which the laser beam is directed towards the location of the head or the face of the driver.

Although portions of the discussion herein relate, for demonstrative purposes, to wired links and/or wired communications, some embodiments are not limited in this regard, and may include one or more wired or wireless links, may utilize one or more components of wireless communication, may utilize one or more methods or protocols of wireless communication, or the like. Some embodiments may utilize wired communication and/or wireless communication.

The system(s) of the present invention may optionally comprise, or may be implemented by utilizing suitable hardware components and/or software components; for example, processors, processor cores, Central Processing Units (CPUs), Digital Signal Processors (DSPs), circuits, Integrated Circuits (ICs), controllers, memory units, registers, accumulators, storage units, input units (e.g., touch-screen, keyboard, keypad, stylus, mouse, touchpad, joystick, trackball, microphones), output units (e.g., screen, touch-screen, monitor, display unit, audio speakers), wired or wireless modems or transceivers or transmitters or receivers, and/or other suitable components and/or modules. The system(s) of the present invention may optionally be implemented by utilizing co-located components, remote components or modules, "cloud computing" servers or devices or storage, client/server architecture, peer-to-peer architecture, distributed architecture, and/or other suitable architectures or system topologies or network topologies.

In accordance with embodiments of the present invention, calculations, operations and/or determinations may be performed locally within a single device, or may be performed by or across multiple devices, or may be performed partially locally and partially remotely (e.g., at a remote server) by optionally utilizing a communication channel to exchange raw data and/or processed data and/or processing results.

Functions, operations, components and/or features described herein with reference to one or more embodiments of the present invention, may be combined with, or may be utilized in combination with, one or more other functions, operations, components and/or features described herein with reference to one or more other embodiments of the present invention. The present invention may thus comprise any possible or suitable combinations, re-arrangements, assembly, re-assembly, or other utilization of some or all of the modules or functions or components that are described herein, even if they are discussed in different locations or different chapters of the above discussion, or even if they are shown across different drawings or multiple drawings.

While certain features of some demonstrative embodiments of the present invention have been illustrated and described herein, various modifications, substitutions, changes, and equivalents may occur to those skilled in the art. Accordingly, the claims are intended to cover all such modifications, substitutions, changes, and equivalents.

What is claimed is:

1. A control component to enable operation of an electric device via voice commands, the control component comprising:
    a hybrid optical-and-acoustic sensor which comprises a self-mix interferometry unit, wherein the hybrid optical-and-acoustic sensor is (I) to capture audio uttered by a human speaker, and (II) to perform self-mix interferometry utilizing an optical feedback beam that is reflected back from said human speaker;
    a voice detector to detect speech uttered within said audio, and to perform speech enhancement by utilizing said self-mix interferometry of the optical feedback beam that is reflected back from said human speaker during time-periods in which an optical beam hits a face of said human speaker;
    an audio recorder to record audio captured by said hybrid optical-and-acoustic sensor, during a time-period in which speech is detected by said voice detector within said audio;
    a wireless transmitter to wirelessly transmit to a remote server, over one or more wireless communication links, a message comprising: (A) digital data reflecting the recorded audio; (B) a Dictionary Identifier Code (DIC) to indicate a particular dictionary table that should be used for performing speech recognition on said recorded audio, out of multiple dictionary tables that correspond to multiple different electric devices that are voice-controllable;
    a DIC selector module, (a) to determine that the electric device is currently operating within a particular operating mode; and (b) to select a particular DIC value that corresponds to said particular operating mode, out of a plurality of DIC values stored within the electric device, wherein said particular DIC value indicates a limited-scope vocabulary dictionary that should be used by the remote server for speech recognition of the recorded audio when the electric device is operating in said particular operating mode;
    a wireless transceiver to wirelessly receive from said remote server, over one or more wireless communication links, data representing a command code determined by said remote server based on speech recognition performed by said remote server on said recorded audio, wherein the command code represents a pre-defined command to the electric device to modify one or more operational parameters of the electric device; and
    an operation control module to trigger one or more modifications to the operation of the electric device, based on the received command code.

2. The control component of claim 1, wherein the wireless transmitter is to transmit to the remote server said Dictionary Identifier Code (DIC) which is unique to said electric device.

3. The control component of claim 1, wherein the wireless transmitter is to transmit to the remote server said Dictionary Identifier Code (DIC) which is non-unique to said electric device and which is unique to a manufacturer of said electric device.

4. The control component of claim 1, wherein the wireless transmitter is to transmit to the remote server said Dictionary Identifier Code (DIC) which is non-unique to said electric device and which is unique to a model number associated with said electric device.

5. The control component of claim 1, wherein the wireless transmitter is to transmit to the remote server said Dictionary Identifier Code (DIC) which is non-unique to said electric device and which is unique to a line-of-products to which said electric device belongs.

6. The control component of claim 1, wherein the wireless transmitter is to transmit to the remote server said Dictionary Identifier Code (DIC) which is non-unique to said electric device and which is unique to a type-of-product to which said electric device belongs.

7. The control component of claim 1, wherein the wireless transmitter is to transmit to the remote server said Dictionary Identifier Code (DIC) which is represented within a unique identifier of said electric device and is not a separate data item.

8. The control component of claim 1, wherein the wireless transmitter is to transmit to the remote server said Dictionary Identifier Code (DIC) which is included within a unique identifier of said electric device.

9. The control component of claim 1, wherein the hybrid optical-and-acoustic sensor comprises an acoustic microphone that is located within the electric device.

10. The control component of claim 1, wherein the hybrid optical-and-acoustic sensor comprises an acoustic microphone that is located externally to the electric device.

11. The control component of claim 1, wherein the electric device comprises a kitchen appliance.

12. A method to enable operation of an electric device via voice commands, the method comprising:
    at a hybrid optical-and-acoustic sensor, which comprises a self-mix interferometry unit, performing: (I) capturing audio uttered by a human speaker, and (II) performing self-mix interferometry utilizing an optical feedback beam that is reflected back from said human speaker;
    detecting that speech is uttered within said audio, and performing speech enhancement by utilizing said self-mix interferometry of the optical feedback beam that is reflected back from said human speaker during time-periods in which an optical beam hits a face of said human speaker;
    recording audio captured by said hybrid optical-and-acoustic sensor, during a time-period in which speech is detected within said audio;
    wirelessly transmitting to a remote server, over one or more wireless communication links, a message comprising: (A) digital data reflecting the recorded audio; (B) a Dictionary Identifier Code (DIC) to indicate a particular dictionary table that should be used for performing speech recognition on said recorded audio, out of multiple dictionary tables that correspond to multiple different electric devices that are voice-controllable;
    determining that the electric device is currently operating within a particular operating mode; and selecting a particular DIC value that corresponds to said particular operating mode, out of a plurality of DIC values stored within the electric device;
    wherein said particular DIC value indicates a limited-scope vocabulary dictionary that should be used by the remote server for speech recognition of the recorded audio when the electric device is operating in said particular operating mode;

wirelessly receiving from said remote server, over one or more wireless communication links, data representing a command code determined by said remote server based on speech recognition performed by said remote server on said recorded audio, wherein the command code represents a pre-defined command to the electric device to modify one or more operational parameters of the electric device; and triggering one or more modifications to the operation of the electric device, based on the received command code.

* * * * *